(12) United States Patent
Otten et al.

(10) Patent No.: US 6,592,485 B2
(45) Date of Patent: Jul. 15, 2003

(54) TRANSMISSION ASSEMBLY WITH INFINITELY VARIABLE AND CONSTANT TRANSMISSION MODULES

(75) Inventors: Uli Otten, Speyer (DE); Ralf-R. Freund, Schwetzingen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/955,812

(22) Filed: Sep. 18, 2001

(65) Prior Publication Data

US 2002/0042319 A1 Apr. 11, 2002

(30) Foreign Application Priority Data

Sep. 26, 2000 (DE) .......................... 100 47 398

(51) Int. Cl.$^7$ .............................................. F16H 47/04
(52) U.S. Cl. ..................... 475/83; 475/207; 74/730.1
(58) Field of Search .................. 475/83, 207; 74/730.1, 74/745

(56) References Cited

U.S. PATENT DOCUMENTS

| 3,802,284 A | 4/1974 | Sharpe et al. |
| 3,990,327 A | * 11/1976 | Margolin .................. 475/80 |
| 4,286,477 A | * 9/1981 | Meyerle et al. ............ 475/82 |
| 5,695,422 A | 12/1997 | Otten |
| 5,768,955 A | 6/1998 | Hauser |

FOREIGN PATENT DOCUMENTS

| DE | 873 782 | 4/1953 |
| DE | 25 31 399 | 7/1975 |
| DE | 370 9 191 | 3/1987 |
| DE | 42 06 086 | 2/1992 |
| DE | 199 44 792 | 9/1999 |
| EP | 0 465 752 | 3/1990 |

* cited by examiner

Primary Examiner—Charles A. Marmor
Assistant Examiner—Dennis Abdelnour (57) ABSTRACT

A transmission assembly with an infinitely variable transmission component and a constant transmission component wherein the components are designed as modular units. The variable transmission module forms a self-contained functional transmission unit with a variable transmission housing, open on at least one side where it contains a flange. Within the flange area extends at least one infinitely variable output shaft of the variable transmission module. The flange allows the attachment of one constant transmission module of a plurality of modules of different power categories as desired.

16 Claims, 6 Drawing Sheets

TRANSMISSION ASSEMBLY WITH INFINITELY VARIABLE AND CONSTANT TRANSMISSION MODULES

BACKGROUND AND SUMMARY OF THE INVENTION

The invention concerns a transmission assembly with an infinitely variable transmission module and a constant transmission module. The transmission ratio of the infinitely variable transmission module can be continuously adjusted within certain limits in the forward and if necessary also in the reverse direction, while the transmission ratio of the constant transmission module is fixed, or adjustable in discrete steps.

In the vehicle industry, besides drive systems with conventional gear changes, infinitely variable drive concepts are also used. In this, power-branched transmissions are also used, which provide acceptable efficiency that is often lacking in an infinitely variable transmission. In power-branched transmissions part of the combustion engine's power is transmitted via an infinitely variable transmission branch and another part of the power is transmitted via a constant, mechanical transmission branch. Having passed through their respective transmission branches, the two power flows are combined and superimposed again and then transmitted to the wheels of the vehicle via mechanical drive elements.

It is known to design the infinitely variable transmission branch as a hydrostatic, toroidal, chain, belt or electrical transmission, while the constant transmission branch can be made as a planetary gear system with integrated gear-change steps. In this context numerous combinations and variants are known to those familiar with the field.

In tractor construction, hydrostatic/mechanical power-branched transmissions are used as infinitely variable drive systems. A power-branched transmission is for example known from EP-A-0 465 752. However, the power-branched transmissions used in tractor construction have a number of disadvantages: particularly because of the large number of components and numerous variants involved, their manufacturing costs are essentially higher than the cost of ordinary part-load or full-load transmissions. The market promotes many transmission variants intended to cover different power requirements and applications. For this, in each case complete new transmissions are needed, since variants cannot be formed with known standard transmission components. The usable speed ranges are distributed in groups which can only be switched to while stationary or in ranges between which one can shift seamlessly. The seamless shift positions in question are often in the main working range of the tractor, in which the shift is perceived as unpleasant.

The objective of the present invention is to provide a transmission assembly with an infinitely variable transmission component and a constant transmission component, by means of which the aforesaid problems are overcome. In particular it must be possible to provide a large number of different transmission variants. The transmission system must satisfy various power requirements and application needs, must achieve optimum efficiency in the main working range, it must be inexpensive to manufacture, requiring a small number of different components, it must be easy to assemble, and shifting must be effected almost imperceptibly.

The transmission assembly according to the invention comprises an infinitely variable transmission component and a constant transmission component. The transmission components are formed as pre-assembled modular units that can be combined to form overall transmission systems as desired. The infinitely variable transmission module is a self-contained functional transmission unit with an adjustment gear housing, which is open on at least one side where it comprises a flange. The flange serves for the attachment, as desired, of constant transmission modules in various power categories and/or with various numbers of gear steps. Within the flange area there extends at least one infinitely variable output shaft of the variable transmission module.

The infinitely variable transmission module can produce infinitely adjustable speeds of its output shaft, and this preferably in both rotation directions. For the constant transmission modules, transmission components designed in various ways with different numbers of gear steps can be considered, in each case comprising a mechanical shift system between several gears and/or groups and if necessary including a reversing unit.

According to the invention, identical infinitely variable transmission modules can be combined with a variety of different constant transmission modules to form a series of transmissions of various power categories. In this, the constant transmission modules are designed for different powers and/or have different numbers of gear steps. The higher the nominal input power of the transmission assembly, the larger is the number of gear steps chosen for the constant transmission module.

It is particularly advantageous to design infinitely variable transmission modules for particular powers, so that they will satisfy the maximum power requirements expected from the transmission series. In this way, the number of gear steps of the constant transmission and the power loss of the transmission system overall can be kept low. Although it is more expensive to manufacture larger infinitely variable transmission modules than smaller ones, this is more than compensated by the variety of uses made possible and the associated considerable increase in the number of units manufactured. The size of the infinitely variable transmission can be restricted by the accommodation space available.

The infinitely variable transmission module is designed for a given power transfer (e.g. 200 kW for an agricultural tractor). By designing the constant transmission module with 1, 2, 3 or more transmission ratios (gears and/or groups), the infinitely variable transmission module can be adapted to the various power categories required for a tractor series. In this way, the same infinitely variable transmission module can be used in all the power categories. This is possible because, with an increasing number of gears and/or groups of the constant transmission module, the power in the infinitely variable transmission module remains the same. This means that for vehicles of lower power, the constant transmission module is made with one or only a few gears and/or groups. On transition to a vehicle the next higher power category, in each case a gear or a group is added to the constant transmission module.

The transmission series according to the invention comprises only a single infinitely variable transmission module, which can be used unchanged for a large range of vehicle categories. This enables a markedly modular structure and provides a wide variety of options for the customer, with a correspondingly more favourable cost structure. Thanks to the individuation of transmission components and the modular structure, the number of different components and the production costs are reduced to the point that they correspond to, or are even less expensive than the cost of conventional part-load transmissions in small and medium vehicle power categories and those of full-load transmissions in larger vehicle power categories. The transmission assembly or transmission series according to the invention makes it possible to assemble and dismantle the modules very simply, provides optimum efficiency in the main working range of the vehicle and has high overall efficiency throughout the speed range.

Preferably, on the side of the infinitely variable transmission module opposite the flange, a transmission input shaft is provided that can be connected to an engine and extends into the adjustment gear housing, also known as the variable transmission housing, and through the infinitely variable transmission module. The constant transmission module is fixed to the flange so that it is spatially adjacent to the infinitely variable transmission module. The infinitely variable and constant transmission branches are aligned with one another and come after one another in the axial direction. The transmission input shaft is at the same time used as an output shaft which transmits the mechanical drive power of the combustion engine directly to the constant transmission module.

It is also advantageous for the transmission input shaft to serve as the input shaft for the infinitely variable transmission module as well as the input shaft for the constant transmission module. It can also be associated with an auxiliary drive, for example in drive connection with a power take-off (PTO) shaft of the working vehicle.

A simpler transmission structure is provided by a preferred further development of the invention, according to which a shaft section extends from the input side to the output side of each transmission module. When the transmission modules are assembled together, the shaft sections are aligned with one another and are in driving connection with one another. They serve as the input shaft for the respective transmission module and/or as the drive shaft for an auxiliary drive system.

It is an advantage if, within the flange area of the infinitely variable transmission module, in addition to the infinitely variable output shaft, there also extends at least one constant output shaft in drive connection with an input shaft of the constant transmission module and aligned or parallel to the latter. The constant output shaft serves to drive a constant transmission module arranged after the variable transmission module. The term "constant shaft" is used to designate shafts whose rotation speed is in a constant transmission ratio relative to the speed of an input shaft, while the speed of an infinitely variable shaft can be adjusted within certain limits in any desired transmission ratio to the speed of the input shaft.

Preferably, at least one infinitely variable output shaft of the variable transmission module extends parallel to and displaced from the transmission input shaft or as a hollow shaft concentrically with respect to a mechanically driven constant output shaft of the variable transmission module.

The infinitely variable transmission module can essentially be any type of infinitely variable transmission. For example, it can be designed as a toroidal or an electrical module. According to a preferred embodiment of the invention, however, the infinitely variable transmission module is a hydrostatic module comprising two hydrostatic units with shafts directed parallel to one another. One of the hyrostatic units is variable displacement pump, while the other hydrostatic unit is a fixed displacement motor or variable displacement motor. The hydrostatic units are attached to a mounting plate via bearings for their shafts.

Preferably, at least one hydrostatically driven output shaft of the hydrostatic module is formed as a hollow shaft, through which extends concentrically a constant output shaft of the hydrostatic module. A preferred hydrostatic unit is described in a U.S. application Ser. No. 09/934,274, filed Aug. 21, 2001 commonly assigned, the specification of which is hereby incorporated by reference.

To make the hydrostatic unit as a functional and testable transmission unit in its own right, it is appropriate to fit a valve housing on the housing of the hydrostatic module, which serves the purpose of providing oil to the hydrostatic unit. For reasons of space, the valve housing is preferably attached to the hydrostatic module housing on its side facing away from the flange.

The valve housing accommodates for example an oil pump and various valves for various adjustable system pressures. It can also provide an oil flow for the lubrication and cooling of transmission components. The valve housing can accommodate an oil filter and various sensors for the measurement of pressure, temperature and flow quantity.

In a preferred embodiment of the invention, the constant transmission module comprises a summation gear which combines the output power of an infinitely variable, in particular, hydrostatically driven output shaft of the variable transmission module with the output power of a constant output shaft of the variable transmission module. In this respect, the transmission assembly can be formed in the manner of an infinitely variable hydro-mechanical power-branched transmission for work vehicles, in which the input shaft power is divided between an infinitely variable transmission module and a constant transmission module, and in which the output shaft powers of the two transmission modules are combined in a summation transmission system. The summation gear housing comprises an input flange adapted to the flange of the adjustment gear housing.

It is considered particularly advantageous to fit a planetary transmission module with an input flange adapted to the flange of the adjustment gear housing after the infinitely variable transmission module. The planetary transmission module can be formed as a so-termed planetary roll consisting of several planetary gears spatially arranged one after another, at least one of which is a summation gear system.

It is appropriate to form one or more of the successively arranged planetary gears as change-over gears, which form the constant transmission module and have one, two, three or four switching transmission ratios and/or a reversing unit. For changing between the transmission ratios, couplings and brakes are provided in the usual way. Preferably, the planetary gear module is designed so that its output shaft can provide torque in both rotation directions. A drive coupling can also be integrated in the planetary transmission.

The constant transmission module can consist of a single component but also several transmission units arranged one after the other. For example, it can consist of a summation gear module and a range module. The modules are separate transmission units, each functional in itself, that can be connected together by flanges and are arranged after one another in the axial direction.

Appropriately, the constant transmission module comprises an input flange and an output flange, respectively located on opposite sides of the transmission housing. If desired, further constant transmission modules of different power categories and/or with different output levels can be attached to the output flange.

Preferably, a further constant transmission module of this type is formed as a range module with at least one group.

The range module can be connected by means of an input flange to an output flange of a previous constant transmission module, in particular, a summation gear housing or a planetary gear module. Its drive shaft is coupled in driven connection to an output shaft of the previous constant transmission module. The transmission assembly appropriately comprises three transmission modules: an infinitely variable transmission module, formed as a hydrostatic unit, a first constant transmission module formed in the manner of a planetary gear module with a summation portion and if desired with a gear range portion, and a second constant transmission module formed as a group transmission module.

If economically viable from the production standpoint, the housing of the first constant transmission module and the second constant transmission module formed as a range module can be made as a common housing component. This provides a housing component open at both ends and having in the middle a partition wall that serves to support the drive shafts. Besides, the housing component has two flanges, such that the input flange is connected to an output flange of the infinitely variable transmission module and the other flange can be connected as output flange to a differential housing or to a rear axle housing of a vehicle.

It is also advantageous to provide a partition wall between two transmission components which prevents the passage of lubricant between them. This makes it possible to use transmission units together which have different requirements in relation to lubricant quality. The partition wall can for example separate a first transmission space containing the hydrostatic unit with its strict lubricant quality requirements, from a second transmission space accommodating mechanical transmission components with less severe demands in terms of lubricant quality.

BRIEF DESCRIPTION OF THE DRAWING

In what follows, the invention, and further advantages and advantageous further developments and design features thereof, will be described and explained in greater detail with reference to the drawing, which shows example embodiments of the invention in which.

DETAILED DESCRIPTION OF THE PREFERRED EMBODIMENT

Figure 1:
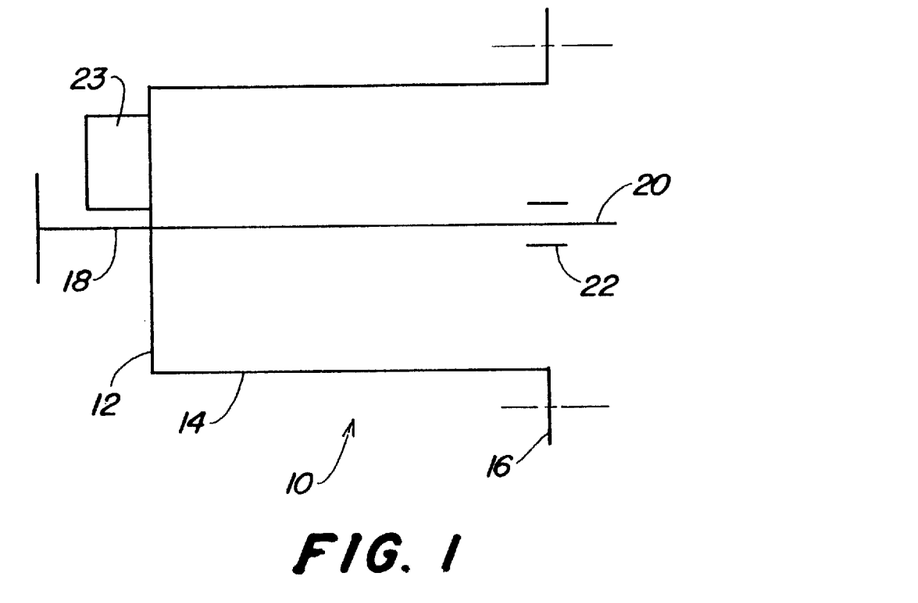
FIG. 1 is a schematic cross-sectional view of the housing of an infinitely variable transmission module

FIG. 1 shows schematically a transmission housing 10 that serves to accommodate a hydrostatic device with which it forms an infinitely variable transmission module. The transmission housing 10 is essentially pot-shaped. It has a bottom 12, essentially cylindrical casing 14, and on the side of the housing opposite the bottom 12, an output flange 16 that serves to attach an adjacent transmission module. An input shaft 18 is shown, that can be connected to the output shaft of a combustion engine (not shown) and which extends centrally through the transmission housing 10. Within the flange region extends a constant output shaft 20, aligned with the input shaft 18 and connected to rotate with the latter, and an infinitely variable output shaft 22 concentric with the constant output shaft 20 and formed as a hollow shaft, whose rotation speed is infinitely adjustable by means of the hydrostatic device accommodated in the transmission housing 10. On the outside of the bottom area 12 is attached a valve housing 23, which serves to supply oil for the hydrostatic units and for the lubrication of the infinitely variable module.

In the housing 10 is arranged a hydrostatic mechanism explained in FIGS. 5 to 12. The hydrostatic mechanism is described in detail in the previously mentioned US patent application. The hydrostatic modules 36 of the transmission assemblies shown in FIGS. 5–12 are all identical. In them, the mechanical power of the input shaft 18 is transmitted on the one hand to the output shaft 20 and on the other hand, via a gear train 24, to a hydrostatic unit formed as variable displacement pump 26. The output of the pump 26 can be varied by an adjustment device 28 and delivers hydraulic fluid via hydraulic lines 30 to a hydrostatic unit formed as a fixed displacement motor 32. The motor 32 drives the hollow output shaft 22 via a gear train 34, so that the speed of the shaft 22 is infinitely variable.

Figure 5:
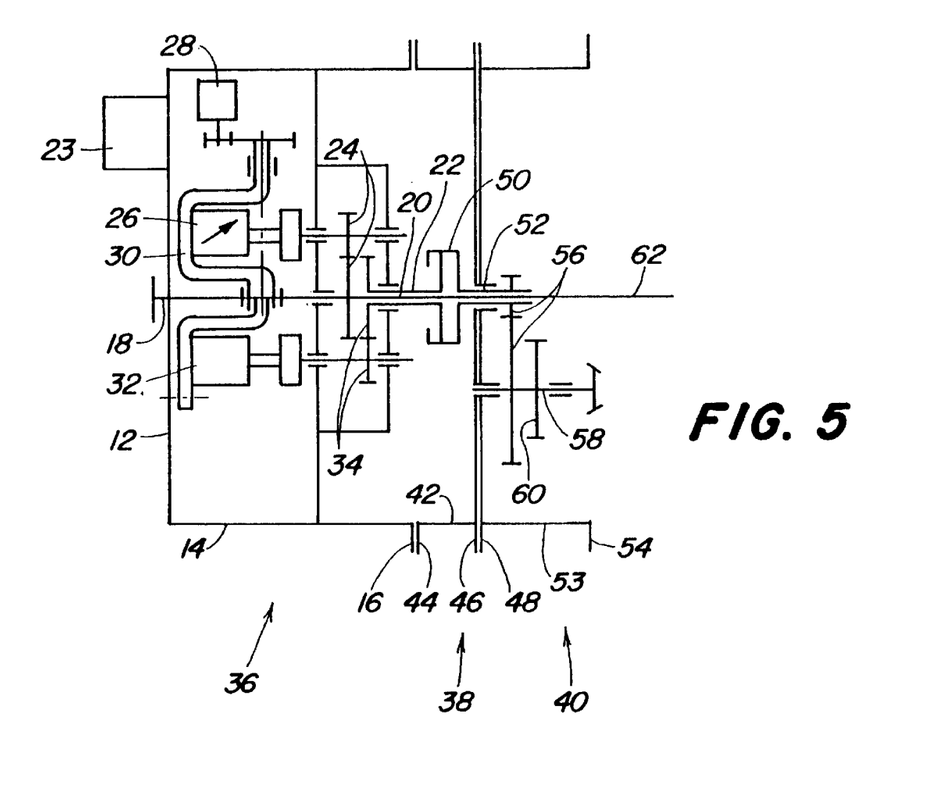
FIG. 5 is a first transmission assembly according to the invention

The transmission assembly shown in FIG. 5 consists of the hydrostatic module 36 mentioned, a drive coupling module 38 and a range module 40. The drive coupling module 38 and the range module 40 are constant transmission modules whose transmission ratios adopt fixed step values and cannot be infinitely adapted to different speeds. The drive coupling module 38 of FIG. 5 comprises a module housing 42 whose input flange 44 is attached to the output flange 16 of the hydrostatic module 36, and whose output flange 46 is attached to an input flange 48 of the range module 40. Within the module housing 42 is arranged a drive coupling 50 that can be activated by a coupling pedal (not shown), by means of which the hollow output shaft 22 of the hydrostatic module 36 can be connected to a hollow input shaft 52 of the range module 40.

The housing 53 of the range module 40 shown in FIG. 5 has an output flange 54 by means of which it can be attached to a differential housing (not shown). The range module 40 comprises only one non-switchable group, formed as a gear train 56 which drives a differential shaft 58. On the differential shaft 58 is mounted to rotate a further toothed wheel 60 that can be used for a front wheel drive (not shown).

Starting from the constant output shaft 20 of the hydrostatic module 36, an auxiliary drive shaft 62 extends through the coupling module 38 and the range module 40, which serves to drive an auxiliary drive system (not shown), for example a power take-off (PTO) shaft. The auxiliary drive shaft 62 can consist of several plug-in shaft sections and extends within the hollow output shaft 22 of the hydrostatic module 36 and the hollow input shaft 52 of the range module 40.

The transmission assembly of FIG. 5 is suitable for vehicles with low drive powers that move forward and backwards and occasionally require a high PTO shaft power (e.g. wheel loaders or snow ploughs). This transmission concept is a pure hydrostatic transmission drive system.

The transmission assemblies described with reference to FIG. 5 comprises three transmission modules, 36, 38 and 40, each of which has a transmission housing of its own and which can be connected together by means of their flanges 16, 44 and 46, 48. It may also be advantageous, however, to combine at least two of the transmission modules in a single housing. For example, the housings 42 and 53 can form a common housing, omitting the flanges 46 and 48. Instead of flanges 46, 48, there will then be a partition wall in the common housing, which serves to support the drive shafts and which is preferably sealed in such a way as to prevent the passage of lubricants.

Figure 6:
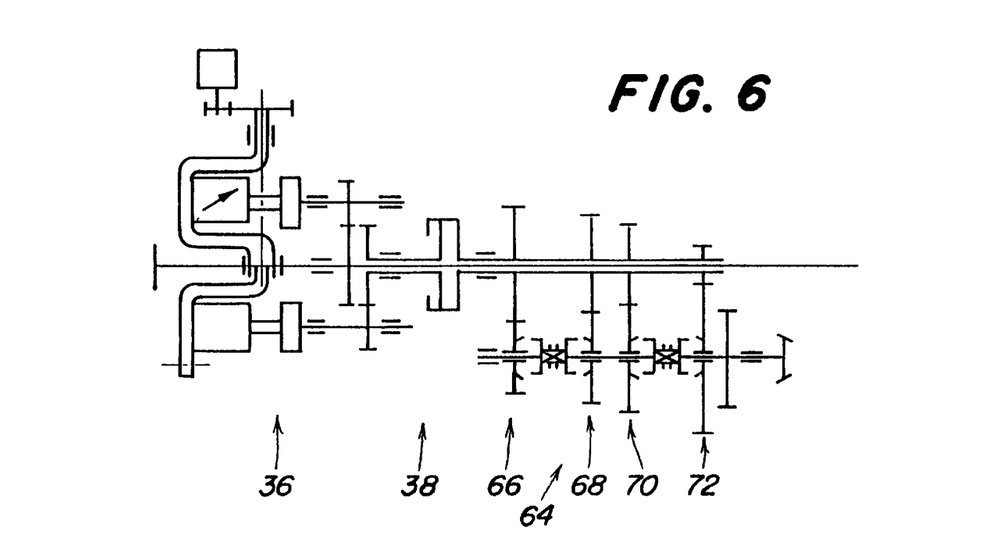
FIG. 6 is a second transmission assembly according to the invention

The transmission assembly shown in FIG. 6 has the same hydrostatic module 36 and the same drive coupling module 38 as the transmission assembly of FIG. 5. Only the group transmission module 64 is different, and according to FIG. 6, has four groups 66, 68, 70 and 72. The transmission assembly shown in FIG. 6 provides equal forwards and reverse speeds and is suitable for simple, low-powered tractors. This transmission concept is also a pure hydrostatic vehicle drive system.

Figure 7:
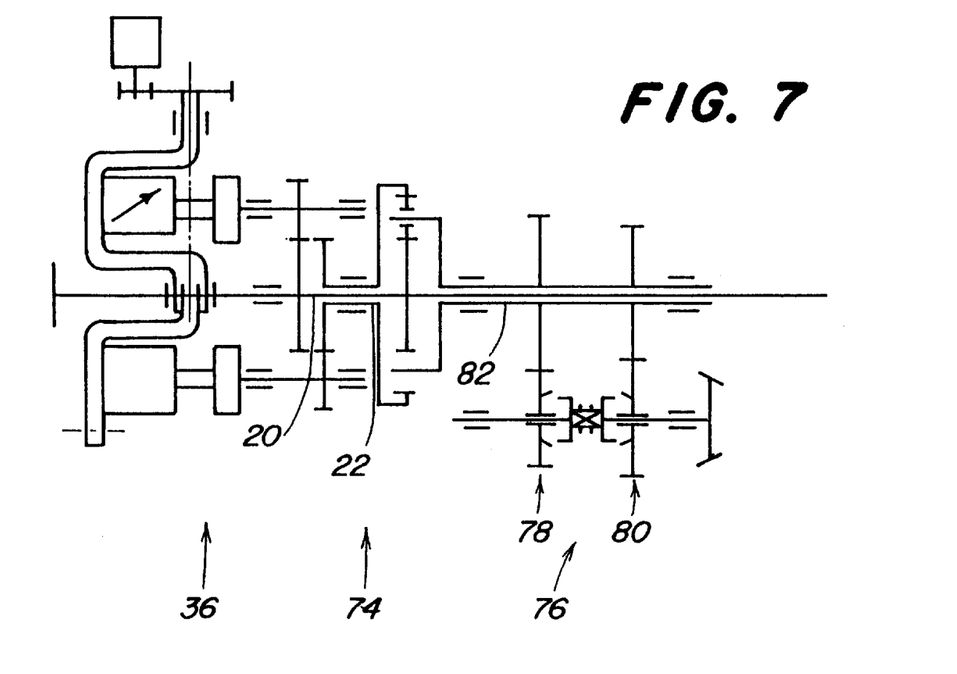
FIG. 7 is a third transmission assembly according to the invention

The transmission assembly shown in FIG. 7 consists of a hydrostatic module 36 according to FIG. 5, a planetary module 74 in place of the drive coupling module 38 in FIG. 5, and a range module 76 with two gear steps 78, 80. The planetary module 74 contains a planetary transmission formed as a summation gear, which combines the output power of the hydrostatic output shaft 22 and the constant output shaft 20 of the hydrostatic module 36 with one another, and transmits the combined power via its hollow output shaft 82 to the range module 76. This arrangement is suitable for vehicles of medium power in which good efficiency is required.

Figure 2:
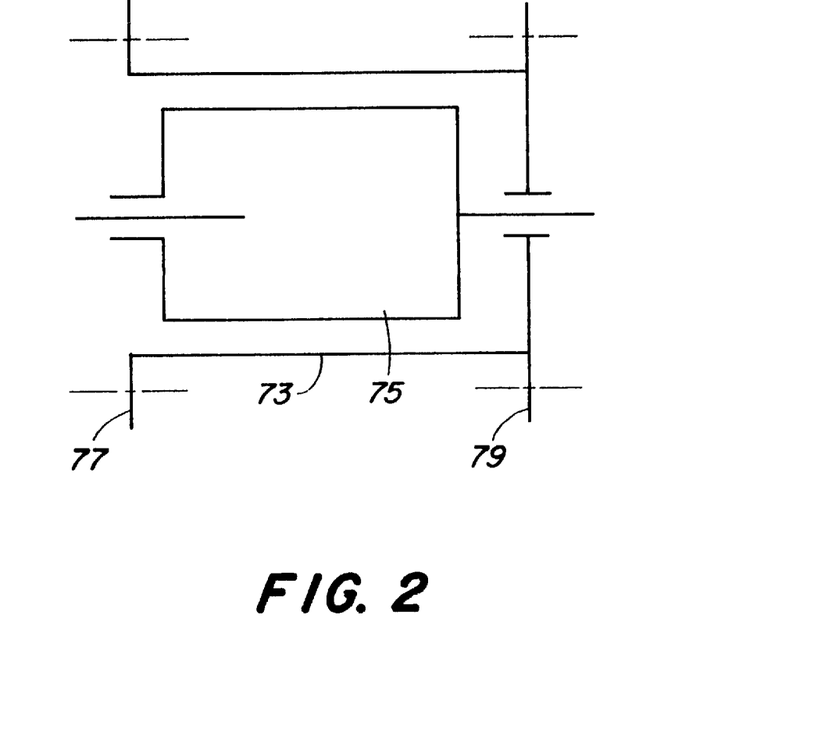
FIG. 2 is a schematic cross-section of the housing of a first constant transmission module

The drive assemblies shown in FIGS. 7 to 12 are hydrostatic/mechanical power-branching transmissions comprising a planetary gearset as the constant transmission module. FIG. 2 shows the structural principle of a housing for such a planetary transmission module. The housing 73 accommodates a planetary gearset 75 and comprises an input flange 77 for attachment to the output flange 16 of the hydrostatic module 36, and an output flange 79 for attachment to the input flange 48 of a subsequent range module.

Figure 3:
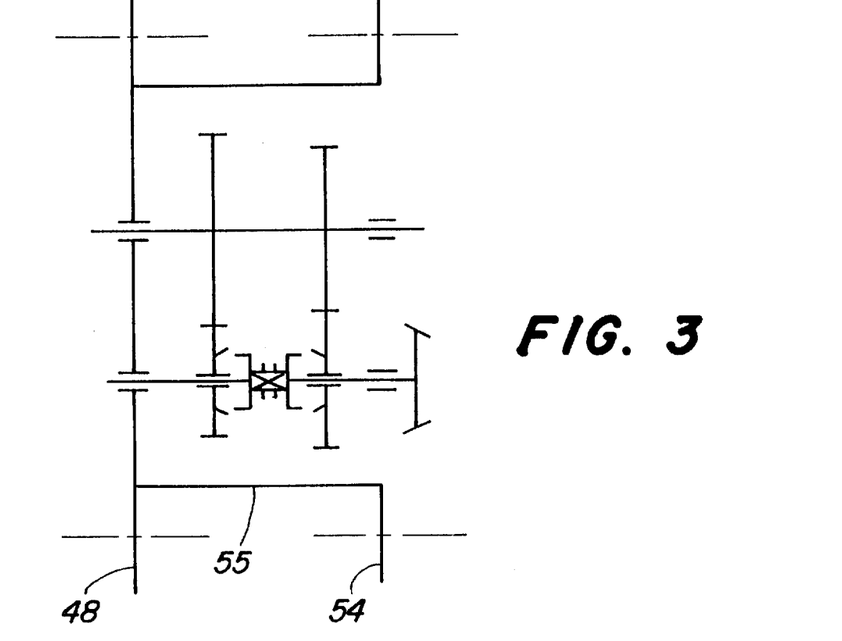
FIG. 3 is a schematic cross-section of a second constant transmission module

FIG. 3 shows a range module whose housing 55 comprises an input flange 48 and an output flange 54. In the transmission housing is arranged a two-step group transmission.

Figure 4:
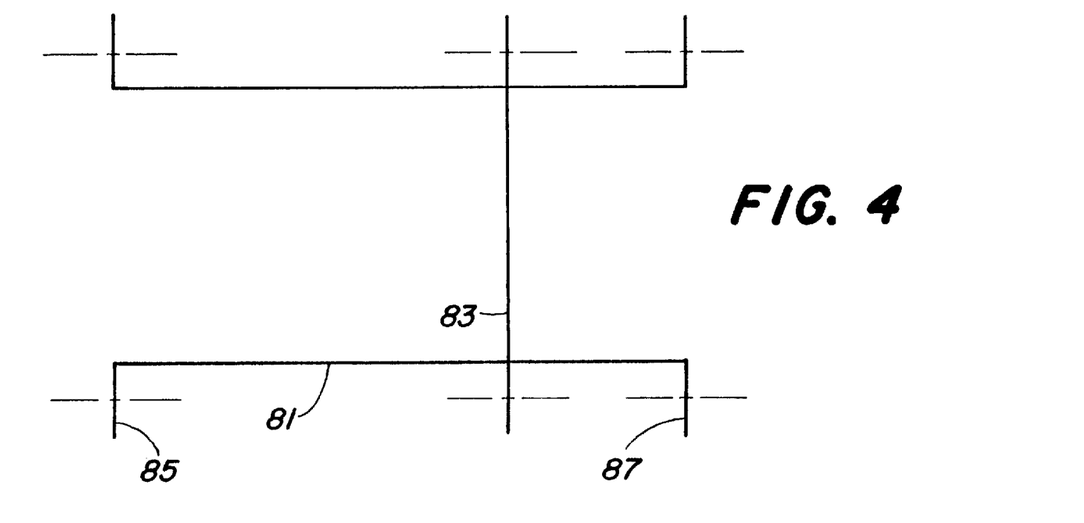
FIG. 4 is a schematic cross-section of the common housing for two constant transmission units

The housings 73, 55 of the planetary module and the range module can be combined into a common housing component 81, as shown in FIG. 4. The one-piece housing component 81 is open at both ends and divided in the middle by a partition wall 83, serving to support the drive shafts (not shown in FIG. 4). In addition, the housing component 81 has two flanges such that the input flange 85 is connected to an output flange 16 of the infinitely variable transmission module, and the other flange can be connected as an output flange 87 to a differential housing or a rear axle housing of a vehicle.

Figure 8:
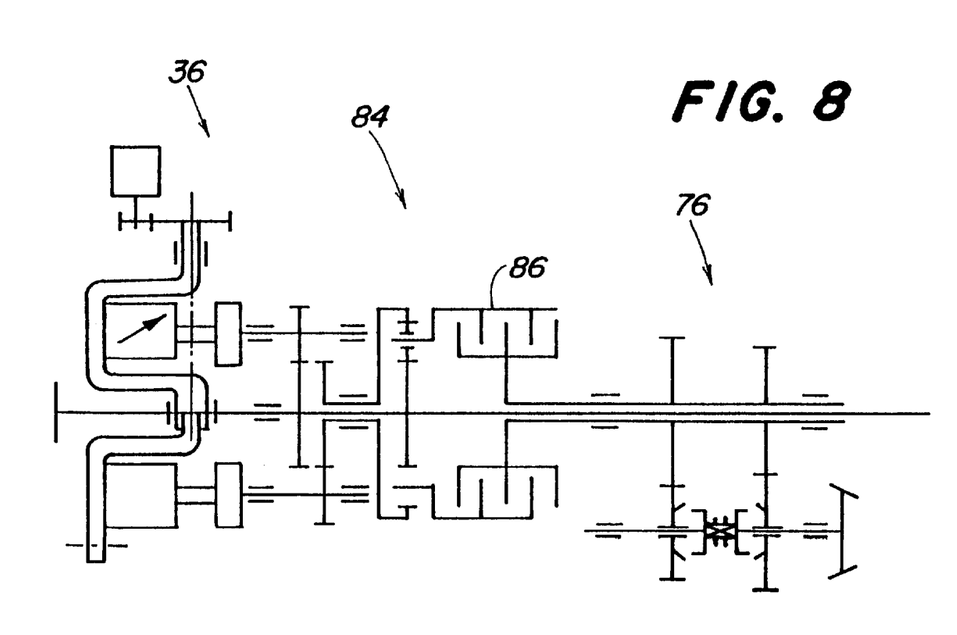
FIG. 8 is a fourth transmission assembly according to the invention

The transmission assembly of FIG. 8 differs from that shown in FIG. 7 only in that a drive coupling 86 is added to the planetary module 84, which enables the operator to limit or control the load on the vehicle output wheel. It is also possible when reversing to cut off energy from the drive coupling (power reverser).

Figure 9:
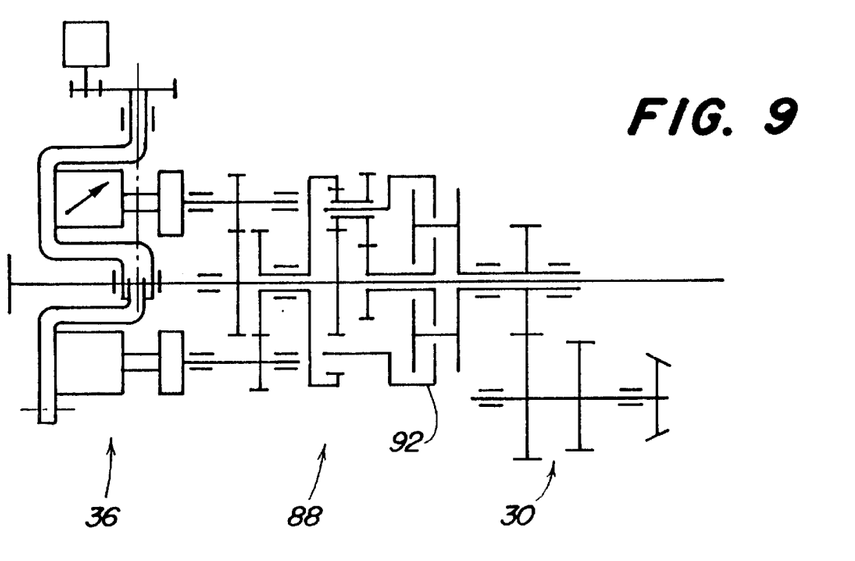
FIG. 9 is a fifth transmission assembly according to the invention

The transmission assembly shown in FIG. 9 consists of a hydrostatic module 36 as in FIG. 5, a planetary module 88 in place of the drive coupling module 38 of FIG. 5, and a range module 90, whose basic structure corresponds to that of the range module 40 in FIG. 5. The planetary module 88 comprises two modes between which it is possible to change under load by actuating a mode coupling 92. This provides forward and reverse driving speeds. This arrangement is suitable for vehicles of medium drive power and high speeds. For vehicles with high drive powers the non-switchable range module 90 illustrated can be replaced by a group transmission with two or more groups (as shown in FIGS. 6 or 8).

Figure 10:
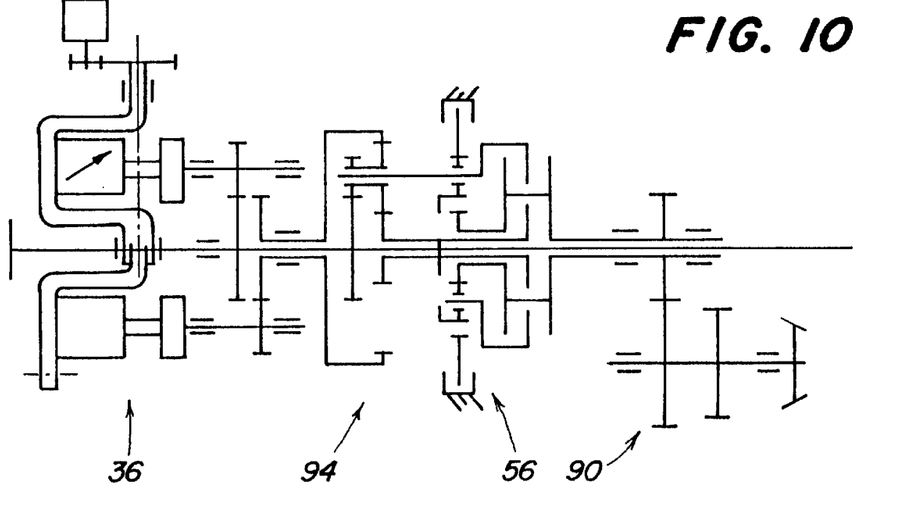
FIG. 10 is a sixth transmission assembly according to the invention

The transmission assembly of FIG. 10 differs from that shown in FIG. 9 in that besides the said modes, its planetary module 94 also comprises an integrated reversing unit 96 as a reversing mechanism in addition to the two modes. This arrangement is suitable for high powered vehicles in which the desired reverse driving speeds are considerably lower than the forward driving speeds.

Figure 11:
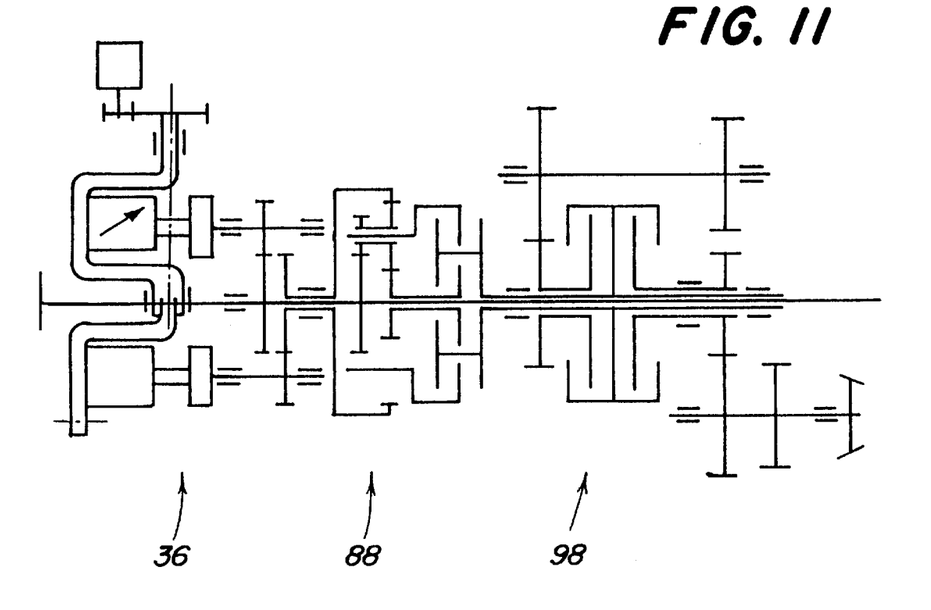
FIG. 11 is a seventh transmission assembly according to the invention.

The transmission assembly shown in FIG. 11 differs from that shown in FIG. 8 in the design of the range module 98. This consists of a group and an integrated reversing mechanism that can be switched in under load, making it possible to drive forwards and in reverse at equal speeds.

Figure 12:
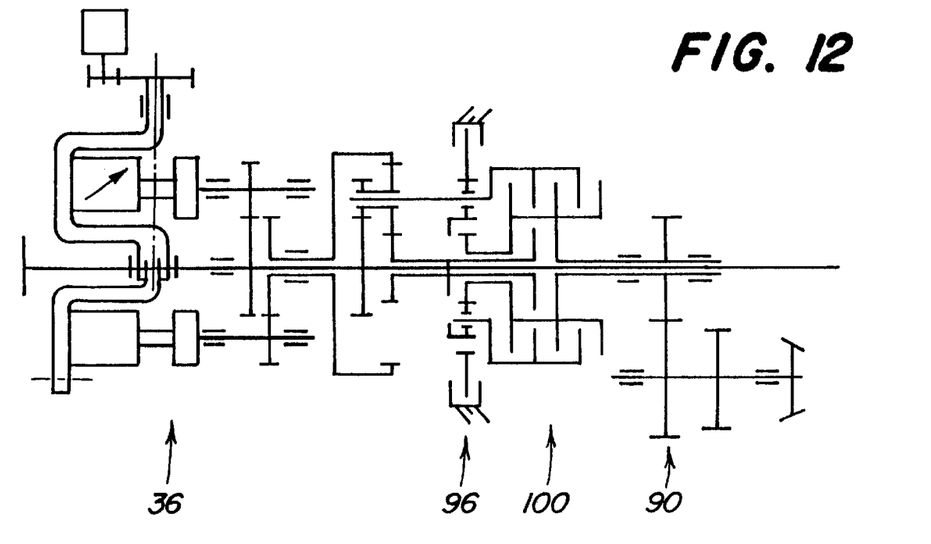
FIG. 12 is an eighth transmission assembly according to the invention.

The transmission assembly shown in FIG. 12 is similar to that shown in FIG. 10. The two differ in the structure of the planetary module which, in FIG. 12, comprises two modes with integrated drive coupling 100 and reverse driving mechanisms. This arrangement is suitable for high drive powers.

Although the present invention has only been described with reference to a few example embodiments, in light of the above descriptions and the drawings to which they refer, those familiar with the field will understand that many different alternatives, modifications and variants fall within its scope.

What is claimed is:

1. A transmission assembly with an infinitely variable transmission component and a constant transmission component wherein the transmission components are designed as modules, the variable transmission module is a self-contained, functional transmission unit within a variable transmission housing open on at least one side and comprising a flange, with at least one infinitely variable output shaft of the infinitely variable transmission module extending within an area of the flange, while the flange is used for the attachment of one of a plurality of constant transmission modules of different power categories as desired and a shaft section extends from the input side to the output side of each transmission module, such that when the transmission modules are assembled together the shaft sections are aligned and in drive connection with one another, the shaft sections serve as drive shafts for an auxiliary drive.

2. The transmission assembly according to claim 1 wherein a transmission input shaft enters the variable transmission housing on the side opposite the flange and extends through the infinitely variable transmission module and the constant transmission module is arranged spatially after the variable transmission module.

3. The transmission assembly according to claim 2, wherein the transmission input shaft serves as an input shaft both for the variable transmission module and for the constant transmission module.

4. The transmission assembly according to claim 3 wherein at least one constant output shaft extends through the flange area of the variable transmission module which is in drive connection with an input shaft of the variable transmission module and which serves to drive the constant transmission module positioned after the variable transmission module.

5. The transmission assembly according to claim 1 wherein at least one infinitely variable output shaft of the variable transmission module extends as a hollow shaft, concentric to a constant output shaft of the variable transmission module.

6. The transmission assembly according to claim 1 wherein the variable transmission module is designed as a hydrostatic unit module and a hydrostatically driven output shaft of the hydrostatic unit module is formed as a hollow shaft, through which a constant output shaft of the hydrostatic unit module extends concentrically.

7. The transmission assembly according to claim 6 wherein the variable transmission housing includes a valve housing on its side facing away from the flange which serves to supply oil to the hydrostatic unit.

8. The transmission assembly according to claim 1 wherein the constant transmission module (74, 84, 88, 94) comprises a summation gear that combines the output power of the infinitely variable output shaft of the variable transmission module with the output power of a constant output shaft of the variable transmission module, and the summation gear housing comprises an input flange adapted to be attached to the flange of the variable transmission housing.

9. The transmission assembly according to claim 1 wherein a planetary transmission module operable as a summation unit is disposed after the variable transmission module and has an input flange adapted to be attached to the flange of the variable transmission housing.

10. The transmission assembly according to claim 9 wherein a first constant transmission module has an input flange for mounting to the flange of the variable transmission module and an output flange opposite its input flange to which other constant transmission modules of different power categories can be connected.

11. The transmission assembly according to claim 1 wherein the constant transmission module includes a planetary transmission having multiple gear ratios.

12. The transmission assembly according to claim 1 further comprising a range module having at least one range.

13. The transmission assembly according to claim 1 further comprising a range module having an input flange attached to an output flange of the constant transmission module, the input shaft of the range module being in drive connection with an output shaft of the constant transmission module.

14. The transmission assembly according to claim 13 wherein the range module comprises an output flange essentially opposite its input flange which can be connected to a differential housing flange of a vehicle rear axle and an output shaft, which can be connected in drive connection to a differential shaft.

15. The transmission assembly according to claim 13 wherein the constant transmission module and the range module are arranged in a common housing member having at its opposite ends an input flange and an output flange and a partition wall in a central area.

16. The transmission assembly according to claim 1 further comprising a partition wall is formed between at least two transmission modules which prevents the penetration of lubricant between the two transmission units.

* * * * *